United States Patent
McNew (10) Patent No.: US 10,260,898 B2
(45) Date of Patent: Apr. 16, 2019

(54) APPARATUS AND METHOD OF DETERMINING AN OPTIMIZED ROUTE FOR A HIGHLY AUTOMATED VEHICLE

(71) Applicant: TOYOTA MOTOR ENGINEERING & MANUFACTURING NORTH AMERICA, INC., Erlanger, KY (US)

(72) Inventor: John-Michael McNew, Ann Arbor, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 190 days.

(21) Appl. No.: 15/208,078

(22) Filed: Jul. 12, 2016

(65) Prior Publication Data
US 2018/0017398 A1 Jan. 18, 2018

(51) Int. Cl.
*G01C 21/34* (2006.01)

(52) U.S. Cl.
CPC ..... *G01C 21/3453* (2013.01); *G01C 21/3492* (2013.01)

(58) Field of Classification Search
CPC ............ G01C 21/3469; G01C 21/3453; G01C 21/3667
USPC .................................................. 701/425, 23
See application file for complete search history.

(56) References Cited

U.S. PATENT DOCUMENTS

| 5,469,356 | A  | * | 11/1995 | Hawkins ............... | G01C 21/26 318/591 |
| 6,661,345 | B1 | * | 12/2003 | Bevan .................... | G08B 21/06 340/575 |
| 6,701,248 | B2 |   | 3/2004  | Petzold et al. | |
| 8,321,067 | B1 | * | 11/2012 | Prada Gomez ...... | G05D 1/0061 701/2 |
| 8,433,470 | B1 | * | 4/2013  | Szybalski ............. | B62D 1/286 701/23 |
| 8,682,574 | B2 | * | 3/2014  | Golding ............ | G01C 21/3484 701/400 |

(Continued)

FOREIGN PATENT DOCUMENTS

| JP | 2015-141052 | 8/2015 |
| JP | 2015-141054 | 8/2015 |

(Continued)

*Primary Examiner* — Angelina Shudy
(74) *Attorney, Agent, or Firm* — Oblon, McClelland, Maier & Neustadt, L.L.P.

(57) ABSTRACT

A navigation apparatus (including configurable circuitry) and method for displaying a plurality of control parameters to carry out a process for generating at least one optimum route for use in navigation of an autonomous vehicle, receiving a plurality of weights corresponding to the plurality of control parameters to generate a route score corresponding to the at least one route, transmitting the plurality of control parameters and the plurality of weights to a server implementing an optimization algorithm to calculate the at least one optimum route using the plurality of control parameters and the plurality of weights, receiving the at least one optimum route and the route score generated by the server, and displaying the at least one optimum route and the route score to enable selection of the at least one optimum route for navigation of the autonomous vehicle from the start location to the destination.

14 Claims, 7 Drawing Sheets

(56) References Cited

U.S. PATENT DOCUMENTS

| | | | |
|---|---|---|---|
| 8,768,624 B2 | 7/2014 | Kobayashi et al. | |
| 8,874,301 B1* | 10/2014 | Rao | B60K 28/066 701/25 |
| 9,031,732 B1* | 5/2015 | Cudak | G01C 21/26 701/23 |
| 9,103,686 B2* | 8/2015 | Pettersson | G01C 21/3469 |
| 9,188,985 B1* | 11/2015 | Hobbs | G01C 21/34 |
| 9,200,910 B2* | 12/2015 | Fowe | G01C 21/3461 |
| 9,428,183 B2* | 8/2016 | Foley | B60W 30/00 |
| 9,493,118 B1* | 11/2016 | Laur | B60Q 9/008 |
| 9,581,460 B1* | 2/2017 | McNew | G01C 21/3667 |
| 9,637,120 B2* | 5/2017 | Laur | B60W 30/09 |
| 9,638,537 B2* | 5/2017 | Abramson | G01C 21/3626 |
| 9,672,738 B1* | 6/2017 | Ferguson | G08G 1/096816 |
| 9,688,288 B1* | 6/2017 | Lathrop | B60W 50/14 |
| 9,802,623 B2* | 10/2017 | Sugaiwa | B60W 50/12 |
| 9,878,723 B2* | 1/2018 | Kim | G05D 1/0061 |
| 9,908,534 B2* | 3/2018 | Desnoyer | B60W 50/14 |
| 9,989,963 B2* | 6/2018 | Perkins | G05D 1/0248 |
| 9,994,219 B2* | 6/2018 | Nilsson | G05D 1/0061 |
| 10,004,873 B1* | 6/2018 | Hur | A61M 21/02 |
| 10,026,317 B2* | 7/2018 | Perkins | B60W 50/0097 |
| 2003/0220722 A1* | 11/2003 | Toba | G10K 15/02 701/1 |
| 2006/0235615 A1 | 10/2006 | Kato et al. | |
| 2009/0192705 A1* | 7/2009 | Golding | G01C 21/3484 701/533 |
| 2012/0046818 A1* | 2/2012 | Nettleton | E21F 17/00 701/23 |
| 2013/0131907 A1* | 5/2013 | Green | G05D 1/0055 701/23 |
| 2013/0231824 A1 | 9/2013 | Wilson et al. | |
| 2014/0156133 A1* | 6/2014 | Cullinane | B60W 30/00 701/23 |
| 2014/0336935 A1* | 11/2014 | Zhu | G01W 1/00 702/3 |
| 2015/0070160 A1* | 3/2015 | Davidsson | B60W 50/14 340/457 |
| 2015/0175168 A1* | 6/2015 | Hoye | B60W 40/09 434/64 |
| 2015/0212705 A1* | 7/2015 | Sasaki | G06F 3/04817 715/777 |
| 2015/0241878 A1* | 8/2015 | Crombez | G05D 1/0088 701/23 |
| 2015/0253772 A1* | 9/2015 | Solyom | G05D 1/0212 701/25 |
| 2015/0253778 A1* | 9/2015 | Rothoff | G05D 1/0088 701/25 |
| 2015/0283998 A1* | 10/2015 | Lind | B60W 30/00 701/23 |
| 2015/0285642 A1 | 10/2015 | Tseng et al. | |
| 2015/0292894 A1 | 10/2015 | Goddard et al. | |
| 2015/0314780 A1* | 11/2015 | Stenneth | B60W 30/00 701/23 |
| 2016/0031441 A1* | 2/2016 | Foley | B60W 30/00 701/23 |
| 2016/0171521 A1* | 6/2016 | Ramirez | G06Q 30/0224 701/409 |
| 2016/0200317 A1* | 7/2016 | Danzl | B60K 28/06 701/25 |
| 2016/0209216 A1* | 7/2016 | Naylor | G01C 21/20 |
| 2016/0209840 A1* | 7/2016 | Kim | G05D 1/0061 |
| 2016/0216130 A1* | 7/2016 | Abramson | G01C 21/3626 |
| 2016/0298976 A1 | 10/2016 | Sato et al. | |
| 2017/0088143 A1* | 3/2017 | Goldman-Shenhar | B60K 35/00 |
| 2017/0234691 A1* | 8/2017 | Abramson | G01C 21/3626 701/442 |
| 2017/0247041 A1* | 8/2017 | Kim | G05D 1/0061 |
| 2017/0284823 A1* | 10/2017 | McNew | G01C 21/3667 |
| 2017/0285641 A1* | 10/2017 | Goldman-Shenhar | B60W 30/182 |
| 2017/0297569 A1* | 10/2017 | Nilsson | G05D 1/0061 |
| 2017/0349185 A1* | 12/2017 | McNew | B60W 50/082 |
| 2017/0370731 A1* | 12/2017 | Bresnahan | G01C 21/34 |
| 2018/0015804 A1* | 1/2018 | McNew | B60H 1/008 |
| 2018/0018874 A1* | 1/2018 | McNew | G08G 1/096741 |
| 2018/0072315 A1* | 3/2018 | Enthaler | B60W 50/14 |
| 2018/0075747 A1* | 3/2018 | Pahwa | G08G 1/164 |
| 2018/0118029 A1* | 5/2018 | Koebler | B60L 15/2045 |
| 2018/0143639 A1* | 5/2018 | Singhal | G01S 13/862 |
| 2018/0196427 A1* | 7/2018 | Majumdar | B60W 50/14 |

FOREIGN PATENT DOCUMENTS

| | | |
|---|---|---|
| JP | 2015-141478 | 8/2015 |
| JP | 2015-158467 | 9/2015 |
| JP | 2015-158469 | 9/2015 |
| JP | 2015-182624 | 10/2015 |
| WO | WO 2015/129366 A1 | 9/2015 |
| WO | WO 2015-162784 A1 | 10/2015 |

* cited by examiner

# APPARATUS AND METHOD OF DETERMINING AN OPTIMIZED ROUTE FOR A HIGHLY AUTOMATED VEHICLE

BACKGROUND

Field of the Disclosure

This application relates generally to improvements in highly automated or autonomous vehicles. More particularly the present disclosure relates to applying driver preferences and historic driving performance in determining an optimized route for autonomous vehicles.

Description of the Related Art

In a conventional navigation system, a driver can input a destination address and the navigation system determines the directions to the destination based on the map stored or accessible to the conventional navigation system. The conventional navigation system is equipped with a global positioning sensor (GPS) to determine a current position of the vehicle. Based on the current position, the conventional navigation system guides the driver to the destination, using audible and visual instructions. As more than one route is available between the current position and the destination, the conventional navigation system choses which route or routes to offer the driver. Often, the route is selected by considering factors of importance for non-autonomous driving such as travel distance or travel time. Furthermore, some navigation systems integrate traffic, road event such as repair or accident related information into the directions, thereby giving the driver flexibility to select a less congested routes.

The conventional navigations, although helpful and suitable for a non-autonomous vehicle, are not adaptive and do not account for factors of interest for autonomous driving. For example, the conventional navigation system routing may not be able to account for hands-free time or sleep time, which are some of the enhanced capabilities of the autonomous vehicle over the non-autonomous vehicle, during a route determination and selection.

Autonomous vehicle is a next generation automotive vehicles with highly increased functionalities and vehicle performance in terms of driving automation. Autonomous vehicle can not only improve driving performance and overall vehicle performance, but also allow driver to sleep, take hands off the wheels, and take eyes off the road, etc. in certain situations. To enable such increased capabilities of a vehicle, several smart components including smart sensors, and communication with driver and other vehicles is necessary. Among the increased capabilities, an efficient routing or navigation system needs to be included that is capable of creating routes that meet the driver's desired autonomous support, which the limited capabilities of conventional navigation systems do not. As such, there remains a continuing need to provide improved navigation systems for autonomous vehicles.

SUMMARY

According to an embodiment of the present disclosure, there is provided a navigation apparatus. The navigation apparatus includes circuitry configured to receive a start location and a destination, and display a plurality of control parameters to carry out a process for generating at least one optimum route from the start location to the destination. The circuitry is further configured to receive a plurality of weights corresponding to the plurality of control parameters to generate a route score corresponding to the at least one optimum route, and transmit, via a network, the plurality of control parameters and the plurality of weights to a server that implements an optimization algorithm to generate the at least one optimum route using the plurality of control parameters and the plurality of weights. The circuitry is further configured to receive, via the network, the at least one optimum route and the route score corresponding to the at least one optimum route generated by the server, and display the at least one optimum and the route score to enable selection of the at least one optimum route for navigation of the autonomous vehicle from the start location to the destination.

Further, according to an embodiment of the present disclosure, there is provided a method for navigation of an autonomous vehicle. The method includes displaying, using a processing circuitry, a plurality of control parameters to carry out a process for generating at least one optimum route for use in navigation of the autonomous vehicle, receiving, via a graphical user interface, a plurality of weights corresponding to the plurality of control parameters, to generate a route score corresponding to the at least one route. The method further including transmitting, via network, the plurality of control parameters and the plurality of weights to a server implementing an optimization algorithm to calculate the at least one optimum route using the plurality of control parameters and the plurality of weights, receiving, via network, the at least one optimum route and the route score generated by the server, and displaying, using the processing circuitry, the at least one optimum route and the route score to enable selection of the at least one optimum route for navigation of the autonomous vehicle from the start location to the destination.

Further, according to an embodiment of the present disclosure, there is provided a non-transitory computer-readable medium which stores a program which, when executed by a computer, causes the computer to perform the method for navigation of an autonomous vehicle, as discussed above. The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings.

DETAILED DESCRIPTION

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) may be practiced without those specific details. In some instances, well-known structures and components may be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," and the like that may be used herein merely describe points of reference with respect to a figure, when the figure is held such that a figure caption is below the figure and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "proximate," and similar terms generally refer to ranges that include the identified value within a margin of 10% or preferably 5% in certain embodiments, and any values therebetween.

Further, the term "autonomous vehicle" can refer to a highly automated vehicle, a fully autonomous vehicle, semi or partially autonomous vehicle and vehicles equipped with various advanced driver assist system (ADAS) such as adaptive cruise control and lane departure alert.

Figure 1:
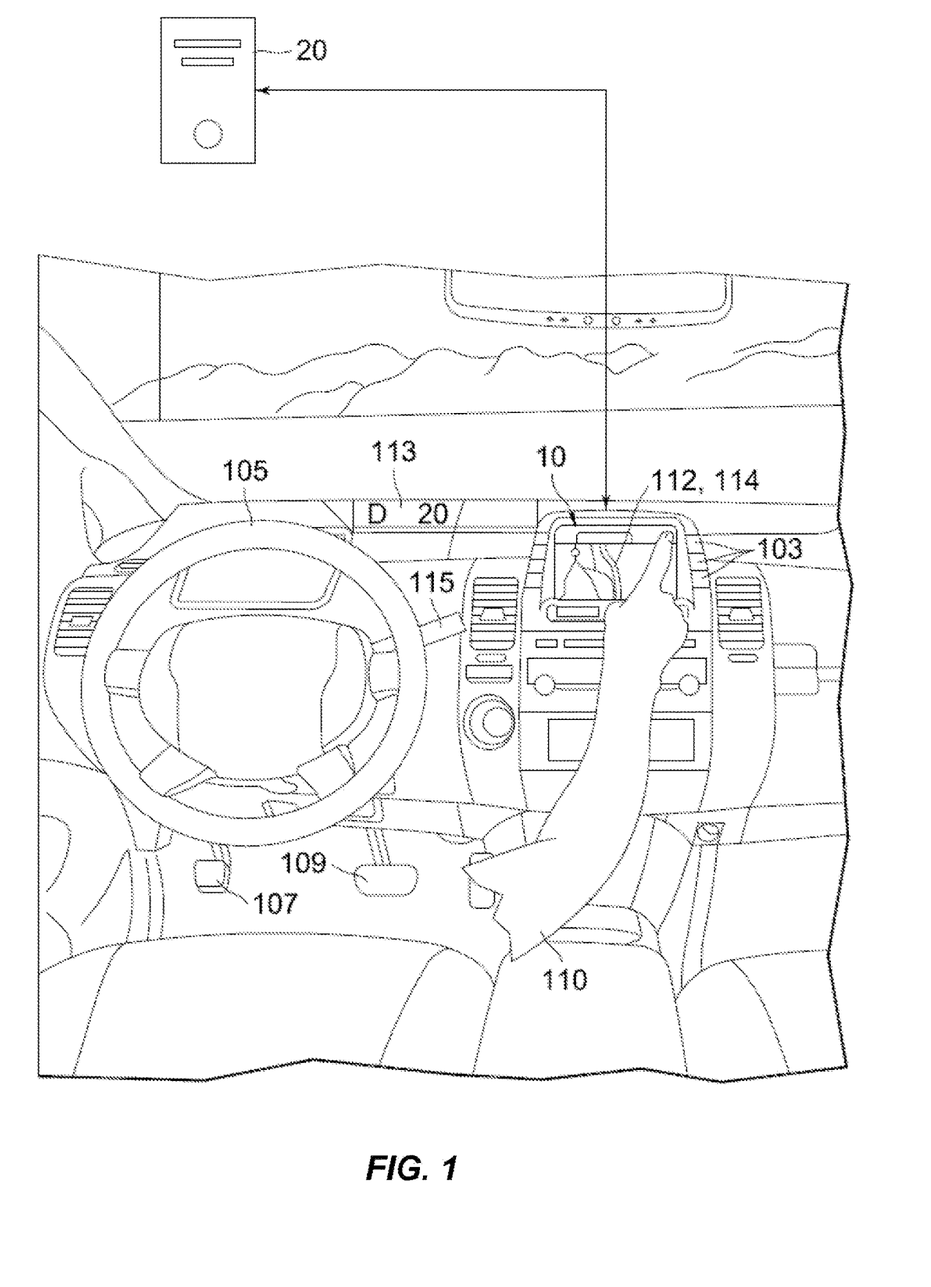
FIG. 1 illustrates an interior view of an autonomous vehicle according to an exemplary embodiment of the present disclosure.

FIG. 1 illustrates a navigation apparatus for an autonomous vehicle according to an exemplary embodiment of the present. The autonomous vehicle includes a navigation apparatus 10 and various electronic and mechanical components. While certain aspects of the disclosure are particularly useful in connection with specific types of vehicles, the autonomous vehicle may be any type of vehicle including, but not limited to, cars, trucks, motorcycles, busses, boats, airplanes, helicopters, lawnmowers, recreational vehicles, amusement park vehicles, trams, golf carts, trains, and trolleys. Further, the autonomous vehicle may include all of the features of a non-autonomous vehicle, for example: a steering apparatus such as steering wheel 105; a navigation apparatus 10 having a navigation display 112 with a touch screen 114; and a driving mode selector apparatus such as a mode shifter 115. The vehicle may also have various user input devices, such as a mode shifter 115, the touch screen 114 or button inputs 103 for activating or deactivating one or more autonomous driving modes and for enabling a driver (or a passenger) 110 to provide information such as a navigation destination to the navigation apparatus 10. In one embodiment, the navigation apparatus 10 can be integrated with the dashboard of the autonomous vehicle. Alternatively or in addition, the navigation apparatus 10 can be detachably attached to a dashboard of the autonomous vehicle. Further, the navigation apparatus 10 can include a clonable display, which refers to a dedicated display onto which the driver can clone the route on an external device such as a smartphone or a tablet. The external device can be placed high on the dashboard, as such the timing for reengagement of the eyes once a warning is issued can be known more precisely than a general eyes-off-road state.

The autonomous vehicle can optionally include more than one display. For example, the vehicle may include a second display 113 for displaying information regarding the status of the autonomous vehicle, navigation status information obtained from the navigation apparatus 10, or other vehicle status information received from a computer such as an electronic control unit (ECU) installed on the autonomous vehicle. The second display 113, in the present example, can display a driving mode "D" and a speed "20" indicating that the vehicle is presently in a drive mode and is moving at 20 miles per hour. In one embodiment, when the drive switches to an autonomous mode, the second display 113 can display the driving mode as "AV" indicating the vehicle is in autonomous mode. Additional modes can include, for example, a hands-free mode "HF", an eyes-off-road mode "EOR", etc.

In one embodiment, the navigation apparatus 10 can also communicate with various components of the vehicle such as the vehicle's conventional ECU (not shown) and can send and receive information from various systems of the autonomous vehicle, for example, a braking system 107, an accelerator 109, and the steering system 105 to control the movement, speed, etc., of the autonomous vehicle.

The autonomous vehicle may also be equipped with a geographic position component such as a GPS receiver to determine the device's latitude, longitude and/or altitude position, an accelerometer, a gyroscope or another direction/speed detection device to determine the direction and speed of the vehicle or changes thereto. Furthermore, the vehicle may also include components for detecting objects and conditions external to the vehicle such as other vehicles, obstacles in the roadway, traffic signals, signs, trees, etc. The detection system may include lasers, sonar, radar detection units (such as those used for adaptive cruise control), cameras, or any other detection devices which record data and send signals to the ECU. Furthermore, the autonomous vehicle can be equipped with a direct short range communication (hereinafter "DSRC") sensor, and an autonomous vehicle (hereinafter "AV") penetration sensor, that allow detection of other autonomous vehicles within the range of the sensors and also enable communication with other autonomous vehicles.

The aforementioned sensors can allow the vehicle to understand and potentially respond to its environment in order to maximize safety for passengers as well as objects or people in the environment. It will be understood that the vehicle types, number and type of sensors, the sensor locations, the sensor fields of view, and the sensors' sensor fields are merely exemplary. Various other configurations may also be utilized.

In one embodiment, the sensors described above can also receive input from sensors installed on a non-autonomous vehicle. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), precipitation sensors for automatic windshield wipers, etc.

The navigation apparatus 10, the ECU or the server 20 can receive or transfer information to and from other computers. For example, a map stored on the server 20 may be received or transferred from the server 20 to the navigation apparatus 10, the sensor data collected from the sensors of the autonomous vehicle can be transmitted to the server 20 for processing. As such, sensor information, and navigation related functions (described with reference to FIGS. 2, 3A and 3B) can be implemented using a central architecture, where the information from the aforementioned sensors and the navigation related functions are processed by a single controller such as the ECU or a plurality of ECUs working in a distributed processing manner. Alternatively, a distributed architecture can be used, in which the navigation related functions are processed partially by the navigation apparatus 10 and partially by the server 20.

Figure 2:
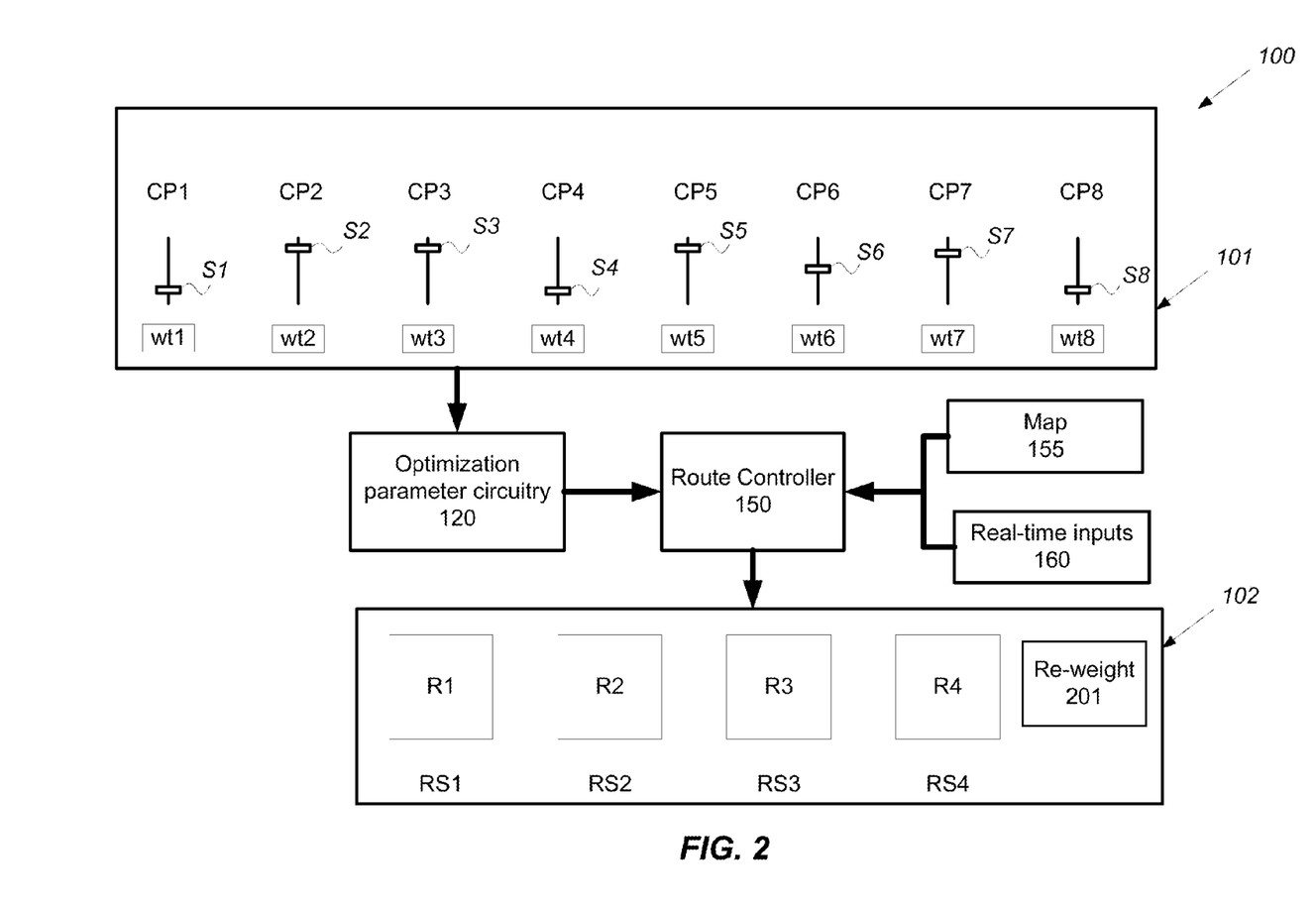
FIG. 2 illustrates a navigation system for an autonomous vehicle according to an exemplary embodiment of the present disclosure.

FIG. 2 illustrates a block diagram of a navigation system 100 according to an exemplary embodiment of the present disclosure. The navigation system 100 can include the navigation apparatus 10 and the server 20. The navigation apparatus 10 is a human machine interface (HMI) that allows a user (e.g., driver 110) to input control parameters (e.g., CP1-CP8), weights (e.g., wt1-wt8), and display one or more maps generated based on the weights of the control parameters. The control parameters are criteria set by the user of the autonomous vehicle that allow the user to be in different states while driving from a starting location to a destination. Some of the control parameters of interest in highly automated driving are allowable driver states such as sleeping, eyes-off-the-road, hands-off-the-wheel (but eyes-on-the-road) time, reclining, non-forward chair, etc. Other parameters of interest relate to expected road safety such as (without loss of generality) DSRC penetration rate, AV penetration rate, construction zones, pothole density, road safety parameter, etc. Finally others may relate to other factors. The control parameters can be associated with a measure such as time (measured in minutes), or distance (measured in miles).

For example, the control parameters CP1-CP8 can be, by way of non-limiting example: a travel time, a hands-free time, eyes-off-road time, sleep time, a DSRC, AV penetration, a road safety parameter and a fuel economy parameter, respectively. In an exemplary embodiment, the travel time is an estimated amount of time required to travel from starting location to a destination using a particular route in an autonomous vehicle. The hands-free time is an amount of time the user can take his/her hands off the steering while the autonomous vehicle is in motion. The eyes-off-road time is an amount of time the user can take his/her eyes off the road while the autonomous vehicle is in motion. The sleep time is an amount of time the user can keep his/her eyes closed while the autonomous vehicle is in motion. DSRC is an estimated number of vehicles on a particular route having a short range communication capability with the autonomous vehicle while in motion. The AV penetration is an estimated number of autonomous vehicles on a particular route while in motion. The safety parameter is a probability of an occurrence of one or more undesirable events on a particular route while in motion wherein a low probability indicates a high safety value, while a high probability indicates a low safety value. The fuel economy parameter is a mileage of the autonomous vehicle on a particular route. The fuel economy parameter can also account for refueling cost considering the gas prices along certain locations along the route.

As illustrated in FIG. 2, the navigation system 100 includes an input interface 101 and an output interface 102. The input interface 101 allows a user to enter weights corresponding to the control parameters CP1-CP8 by moving a range slider control S1-S8 ("sliders"), respectively or by entering numerical values such as weights wt1-wt8, respectively. The sliders S1-S8 can be moved upwards along a vertical axis to increase the weight wt1-wt8, respectively, and downwards along the vertical axis to decrease the weights wt1-wt8, respectively. In another embodiment, the sliders S1-S8 can be moved towards the right of the interface to increase the weights wt1-wt8, respectively, and towards the left of the interface to decrease the weights wt1-wt8, respectively. The weights wt1-wt8 indicate the user's or the driver's preference of each of the control parameter CP1-CP8, respectively, and assist in determining a route from a starting location to a destination. For example, the user can assign the following weights: 5 for travel time (or CP1), 10 for hands-free time (or CP2), 10 for eyes-off-road time (or CP3), 10 for sleep time (or CP4), 5 for DSRC (or CP5), 5 for AV penetration (or CP6), 6 for safety (or CP7) and 2 for fuel economy (or CP8).

The control parameters CP1-CP8 and the weights wt1-wt8 are transmitted to an optimization parameter circuitry 120. The optimization parameter circuitry 120 converts the weights to optimization parameters appropriate for the optimization to be executed on a route controller 150. The optimization parameter circuitry 120 may further consider information that the user does not explicitly input. For instance, the optimization parameter circuitry 120 may extract (from a database of the server 20 or memory of navigation apparatus 10) a constraint of minimum clearance based on the vehicle's physical size that can be used to filter out routes with bridge clearances that are low. The optimization parameter circuitry 120 may also rescale the weights to determine a set of optimization parameters depending on vehicle characteristics. For instance, the weights for fuel economy may be increased or decreased based on the fuel economy characteristics of the particular vehicle. Thus, the weights and control parameters can be converted into a set of optimization parameters by the optimization parameter circuitry 120.

The optimization parameter circuitry 120 can utilize a pre-determined optimization weight conversion, which is a set of conversion functions that convert the weights wt1-wt8 and control parameters CP1-CP8 into optimization parameters. Alternatively or in addition, the optimization parameter circuitry 120 may also include a real-time input 160 into the conversion of the parameters such as vehicle set speed or vehicle weight. A controller (for example, controller 510 of the user device 500 or a CPU 400 of the server 20) or processing circuitry such as the optimization parameter circuitry 120 includes a programmed processor. The processing circuitry or controller may also include devices such as an application specific integrated circuit (ASIC) and conventional circuit components arranged to perform the recited functions. The processing circuitry or controller can be a part of the navigation apparatus 10 or the server 20 as discussed in more detail with respect to FIGS. 4 and 5. Each of the functions of the described embodiments (with reference to FIGS. 2, 3A and 3B) can be implemented by one or more processing circuits or controllers.

The optimization parameters obtained from the optimization parameter circuitry 120 can be transmitted to the route controller 150. The route controller 150 is configured to generate optimized routes using a map 155 and applying an optimization algorithm that applies the optimization parameters and an optimization method to obtain the optimization map and generates optimum routes based on a maximizing or minimizing a route scoring. The optimization methods may include among others dynamic programming and genetic algorithms.

The optimization map can be a set of road segments for which the costs or benefits associated with the optimization parameters (and by extension the control parameters CP1-CP8 can be determined. For instance, the amount of hands-free time, eyes-off-road time or the expected safety of each road segment. The optimization map can be pre-determined, stored in a memory and retrieved from the memory on-demand or the optimization map can be dynamically generated using the real-time input 160 information such as real-time traffic, vehicle speed, real-time DSRC penetration, or the map can be a hybrid of real-time based and based on costs or benefits of past information stored in the memory. Alternatively or in addition, the optimization map can be generated based only on data collected by the ego-vehicle by driving the ego-vehicle on various routes and measuring the control parameters CP1-CP8 in different driving modes such as AV, manual, HF, etc. The measurements can be used as an input dataset to an optimization algorithm which can output revised weights for each control parameters CP1-CP8.

The optimized routes (e.g., routes R1-R4), generated by route controller 150, significantly satisfy user's preferences of the control parameters CP1-CP8 input in the input interface 101. Further, for each optimized route (e.g., routes R1-R4), the route controller 150 computes a route score (e.g., RS1-RS4). The route scores indicate how closely the user preferences received from the input interface 101 are satisfied. The route score (e.g., RS1) for instance can be calculated as an average of the weights wt1-wt8 divided by the optimized weight of the control parameter CP1-CP8 considered while determining the optimum routes (e.g., R1).

The optimized routes and the route scores generated by the route controller 150 can be transmitted to the output interface 102 of the navigation apparatus 10, which displays the optimized routes R1-R4 and the route scores RS1-RS4, respectively. The output interface 102 can also include a re-weight button 201. If the user is not satisfied by the optimized routes, the re-weight button 201, when activated, allows the user to transition to the input interface 101 to change the weights of the controller parameters CP1-CP8.

Figure 3A:
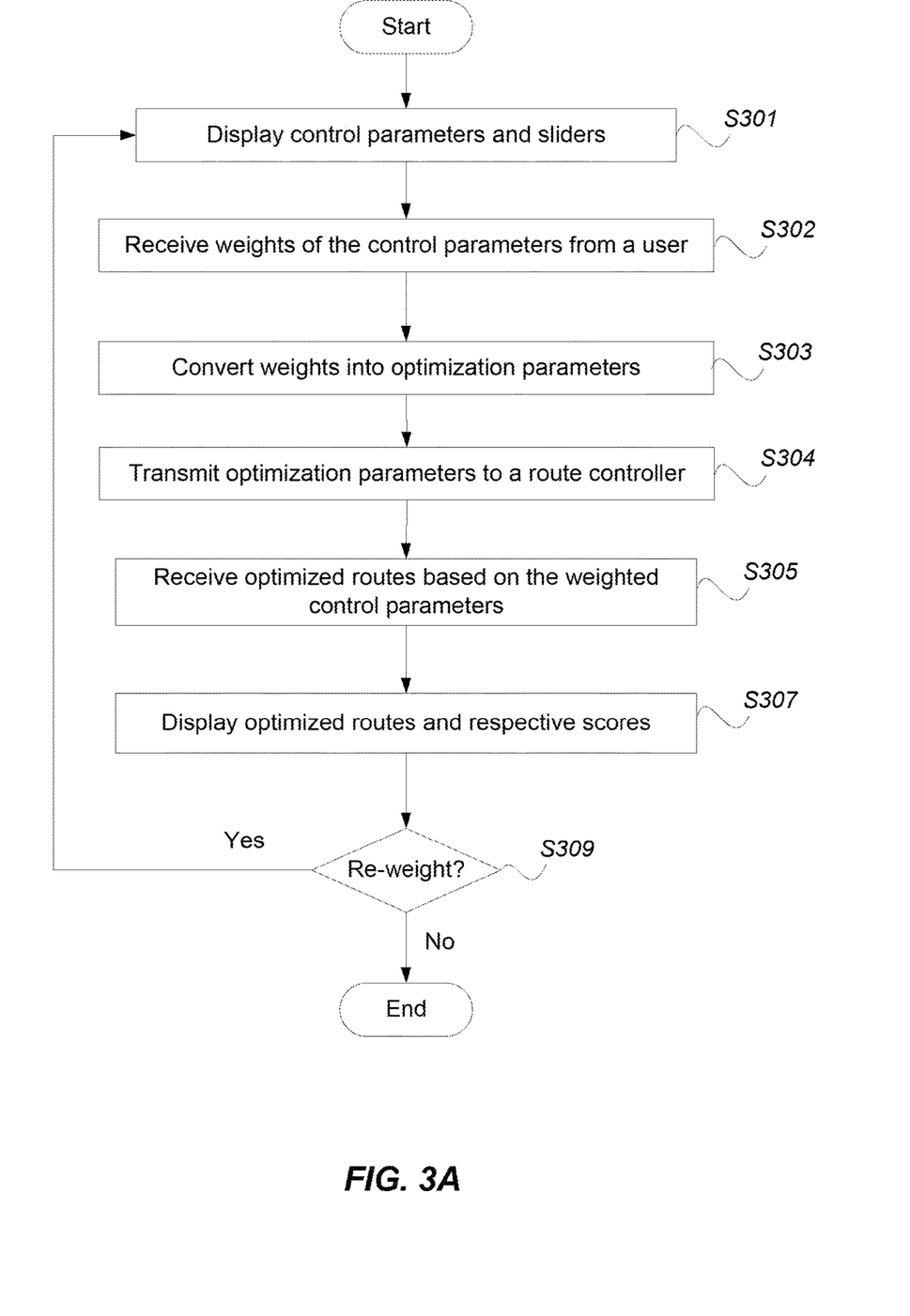
FIG. 3A is a flow chart of a process performed by the navigation apparatus according to an embodiment of the present disclosure.

FIG. 3A is an exemplary flow chart of a process performed by the navigation apparatus 10 according to an embodiment of the present disclosure. The process starts when a user activates the navigation apparatus 10 using a power-ON button (not shown) or by making contact with the touch screen 114. In step S301, the navigation apparatus 10 displays the control parameters (e.g., CP1-CP8) and corresponding sliders (e.g., S1-S8) for weight adjustment on the display of the input interface 101.

In step S302, the input interface 101 of the navigation apparatus 10 receives the weights (e.g. wt1-wt8) of the control parameters (e.g., CP1-CP8) from a user. As discussed above, the weights wt1-wt8 of the control parameters CP1-CP8 can be assigned by moving the slider S1-S8, where the slider motion can be proportional to the weights wt1-wt8. Alternatively, a user can enter a numerical value (e.g., from 1 to 10) of the weights wt1-wt8. The control parameters CP1-CP8 and the corresponding weights wt1-wt8 can be transmitted, via a network to the server 20 for processing such as determining an optimized route.

In step S303, the weights input by the user are converted to optimization parameters. The conversion can be based on conversion functions that convert the weights wt1-wt8 and control parameters CP1-CP8 into optimization parameters. In step S304, the optimization parameters are transmitted to the route controller 150.

In step S305, the navigation apparatus 10 receives from the server 20 optimized routes and respective route scores that are determined based on the weighted control parameters. Alternatively, the optimized routes can be determined by a computer (e.g., an ECU) installed on the autonomous vehicle.

The optimized routes (e.g., R1-R4) are displayed along with respective scores (e.g., RS1-RS4), in step S307. The optimized routes (e.g., R1-R4) can be displayed on the display of the output interface 102 of the navigation apparatus 10. Further, one of the optimized routes R1-R4 can be selected by the user based on the score RS1-RS4. For example, the user can select route R1 with a route score RS1 of 90, which indicates RS1 fulfills most of the user preferences as set for the control parameters CP1-CP8, in step S302. In another example, the user can select route R2 with a low route score RS2 of 20, as the route R2 may include maximum sleep time (control parameter CP4). In another example, the user can select route R3 with a low route score RS3 of 40, as the route R3 may include maximum AV penetration (control parameter CP6).

In another embodiment, the user may not choose any of the routes R1-R4 and decide to re-weight the control parameters CP1-CP8. The user can indicate a re-weight requirement by activating the re-weight button 201 on the output interface 102 of the navigation apparatus 10. In step S309, a determination is made whether a re-weight signal is received by the navigation apparatus 10. If the re-weight signal is received, the process continuous from the step S301.

Figure 3B:
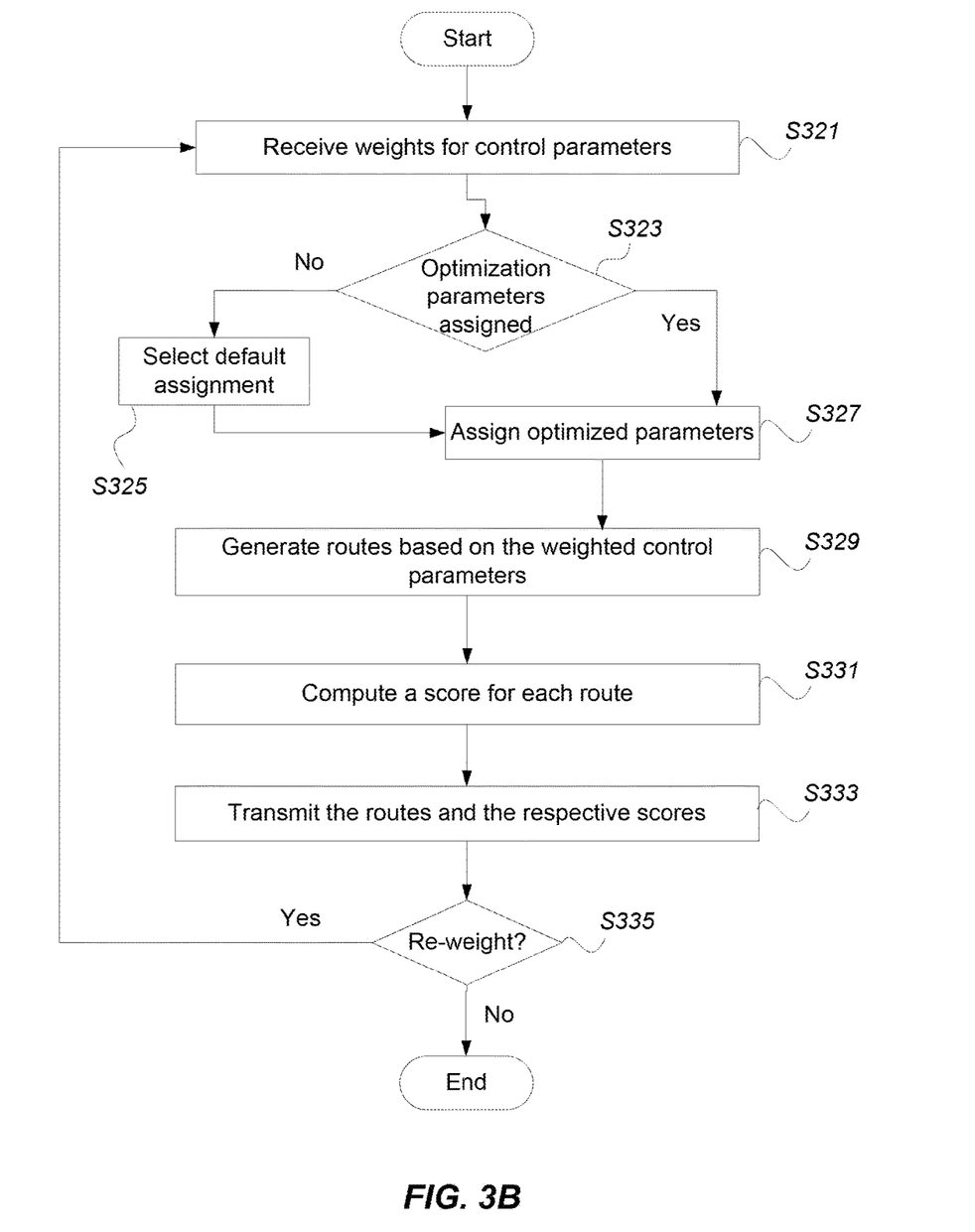
FIG. 3B is a flow chart of a process performed by a server according to an embodiment of the present disclosure.

FIG. 3B is an exemplary flow chart of a process performed by the server 20 according to an exemplary embodiment of the present disclosure. The process starts when the server 20 receives the optimization parameters from the optimization parameter circuitry 120. In step S321, the server 20 receives the weights assigned by the user from the navigation apparatus 10. In step S323, the server 20 determines whether the optimization parameters are assigned. If the optimization parameters are not assigned, default assignments can be selected, in step S325. The default parameters can be stored in the memory of the server 20.

In step S327, the server 20 assigns optimization parameters. The optimized parameters can be determined as discussed earlier with respect to FIG. 2. The optimized parameters can be further used to generate different routes based on the optimization parameters, in step S329.

In step S331, a route score for each route can be computed. The route score (e.g., RS1-RS4) can be, for instance, based on a control parameter ratio, which is a ratio of data corresponding to all control parameters associated with the respective routes. The control parameter ratio can further account for the weights to determine the route score. For example, if the control parameter ratio based on all measurable control parameters (e.g., time) is x1:x2:x3:x4:x5:x6:x7:x8, then the route score will be (wt1*x1+wt2*x2+wt3*x3+wt4*x4+wt5*x5+wt6*x6+wt7*x7+wt8*x8)/(wt1+wt2+wt3+wt4+wt5+wt6+wt7+wt8). The step 331 can also be performed by the navigation apparatus 10 using the controller 510.

In step S333, the server 20 transmits the routes and the respective route scores to the output interface 102 of the navigation apparatus 10. In step S335, a determination is made whether re-weighting is required. The determination is based on the signal received from the output interface 102 of the navigation apparatus 10 when the user activates the re-weight button 201. If re-weight is requested by the user, the process continues to the step S321.

Figure 3C:
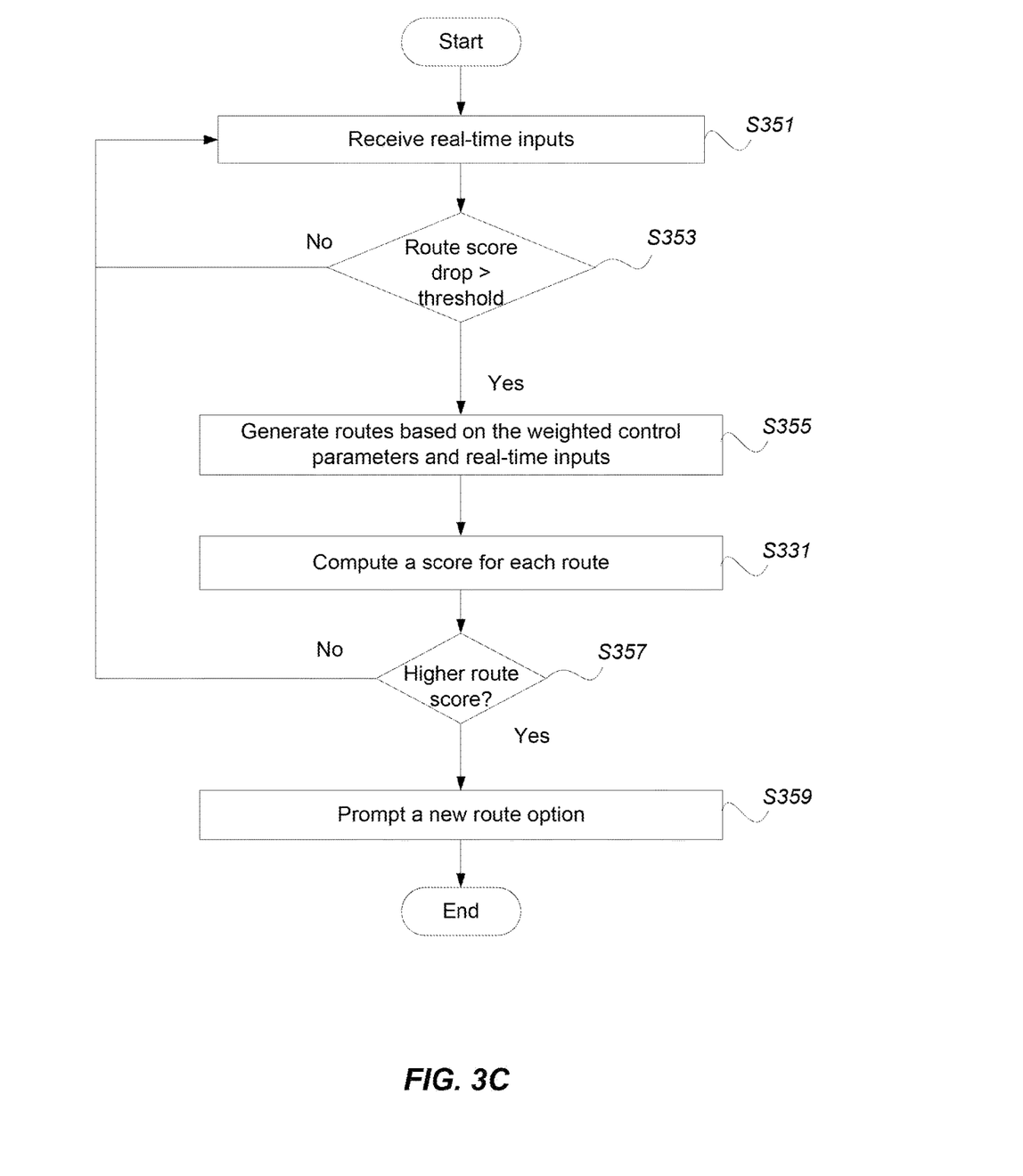
FIG. 3C is a flow chart of a process performed by a server using real-time data according to an embodiment of the present disclosure.

FIG. 3C is a flow chart of a process performed by the server 20 using real-time data according to an embodiment of the present disclosure. The process starts when the server receives real-time data in step 351. The real-time inputs can be traffic conditions, road repairs, accidents, crime activity, emergency situations, etc. If the optimization map uses dynamic information such as real-time traffic, an optimal route may become less than optimal. In one embodiment of the present disclosure, the vehicle transmits the chosen route and the vehicle position to the sever 20 in real-time. The server 20 monitors the route score obtained from the optimization process. In step S353, if the route score drops more than a threshold, for instance, greater than 30%, the server will generate routes, similar to the steps S329 in FIG. 3B, based on the weighted control parameters (previously input by the user) and the real-time inputs. Furthermore, the server computes a score for each new route, in step 331 (similar to step 331 in FIG. 3B). If an alternate route is generated with a significantly higher score, in step 357, the server 20 informs the navigation apparatus 10. In step S359, the server 20 transmits the new route to the navigation apparatus 10, which then prompts an alternate route with the higher score to the user. For instance, if a route is chosen by the user whose primary weight is on fuel economy and later traffic on the route changes from free flowing to stop-and-go traffic, the server 20 may suggest and alternative routes. The alternative route may have lower fuel economy than the chosen route, but comparatively higher fuel economy among the alternate routes. In another scenario, if an accident happens along the chosen route and hence sleeping may not be allowed, the server 20 may suggest alternate routes, along which sleeping may be feasible.

Figure 4:
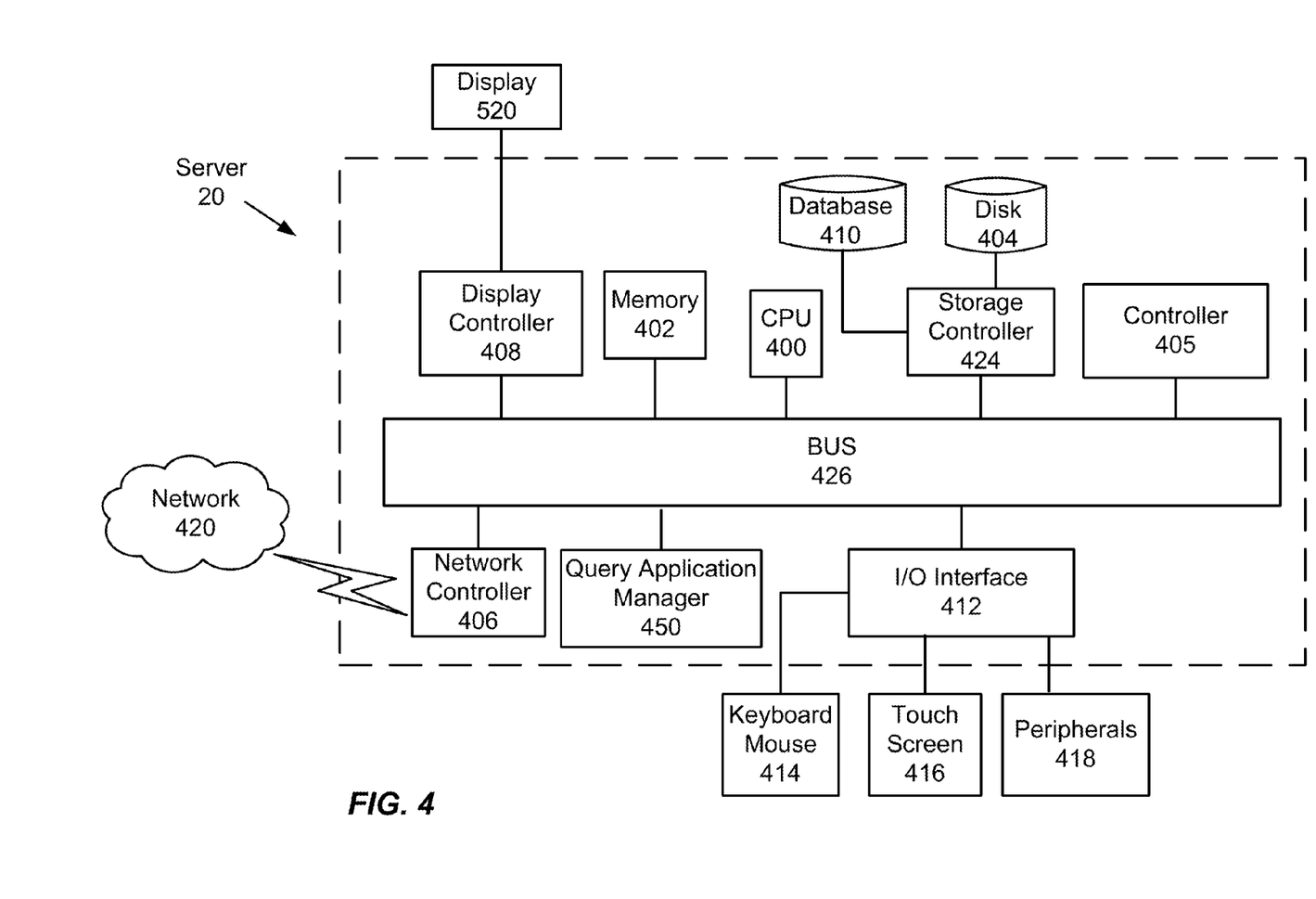
FIG. 4 is a detailed block diagram illustrating hardware of the server according to exemplary embodiment of the present disclosure.

FIG. 4 is a detailed block diagram illustrating an exemplary server 20 according to certain embodiments of the present disclosure. In FIG. 4, the server 20 includes a CPU 400 which can be configured to perform the processes described in the present disclosure. The process data, instructions and the map 150 (discussed with respect to FIGS. 2, 3A and 3B) may be stored in a memory 402. These processes, instructions and the map 150 may also be stored on a storage medium disk 404 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 20 communicates, such as a server or computer.

Further, the claimed advancements may be provided as a utility application, background daemon, or component of an operating system, or combination thereof, executing in conjunction with CPU 400 and an operating system such as Microsoft Windows 7, UNIX, Solaris, LINUX, Apple MAC-OS and other systems known to those skilled in the art.

The hardware elements, in order to achieve the server 20, may be realized by various circuitry elements, known to those skilled in the art. For example, CPU 400 may be a Xenon or Core processor from Intel of America or an Opteron processor from AMD of America, or may be other processor types that would be recognized by one of ordinary skill in the art. Alternatively, the CPU 400 may be implemented on an FPGA, ASIC, PLD or using discrete logic circuits, as one of ordinary skill in the art would recognize. Further, CPU 400 may be implemented as multiple processors cooperatively working in parallel to perform the instructions of the inventive processes described above with respect to FIGS. 2, 3A and 3B.

The server 20, in FIG. 4, also includes a network controller 406, such as an Intel Ethernet PRO network interface card from Intel Corporation of America, for interfacing with a network 420. As can be appreciated, the network 420 can be a public network, such as the Internet, or a private network such as an LAN or WAN network, or any combination thereof and can also include PSTN or ISDN subnetworks. The network 420 can also be wired, such as an Ethernet network, or can be wireless such as a cellular network including EDGE, 3G and 4G wireless cellular systems. The wireless network can also be WiFi, Bluetooth, or any other wireless form of communication that is known. The server 20 can communicate with external devices such as the user device 500 via the network controller 406.

The server 20 can further include a display controller 408, such as a NVIDIA GeForce GTX or Quadro graphics adaptor from NVIDIA Corporation of America for interfacing with display 520. The display controller can control a user display 520 directly or via the network 420. An I/O interface 412 interfaces with a keyboard and/or mouse 414 as well as a touch screen panel 416 on or separate from display 520. The I/O interface also connects to a variety of peripherals 418 including printers and scanners. Further, the server 20 can be connected to the user device 500 via the I/O interface 412 or through the network 420. A user device 500 can send queries that are handled by a query application manager 450 including extracting data from the disk 404 or the database 410 via the storage controller 424, from the memory 402, or trigger execution of processes discussed in FIGS. 2, 3A and 3B.

The controller 405 can be used to implement the optimized weight mapping circuitry 120 and the route controller 150 shown in FIG. 2 and may include one or more CPUs, and may control each element in the user device 500 to perform functions related to communication control, audio signal processing, control for the audio signal processing, still and moving image processing and control, and other kinds of signal processing. The controller 405 may perform these functions by executing instructions stored in a memory 402, for example, the processes illustrated in FIGS. 2, and 3B.

The storage controller 424 connects the storage medium disk 404 or the database 410 with communication bus 426, which may be an ISA, EISA, VESA, PCI, or similar device, for interconnecting all of the components of the server 20. A description of the general features and functionality of the display 520, keyboard and/or mouse 414, as well as the display controller 408, the storage controller 424, network controller 406, and the I/O interface 412 is omitted herein for brevity as these features are known.

Figure 5:
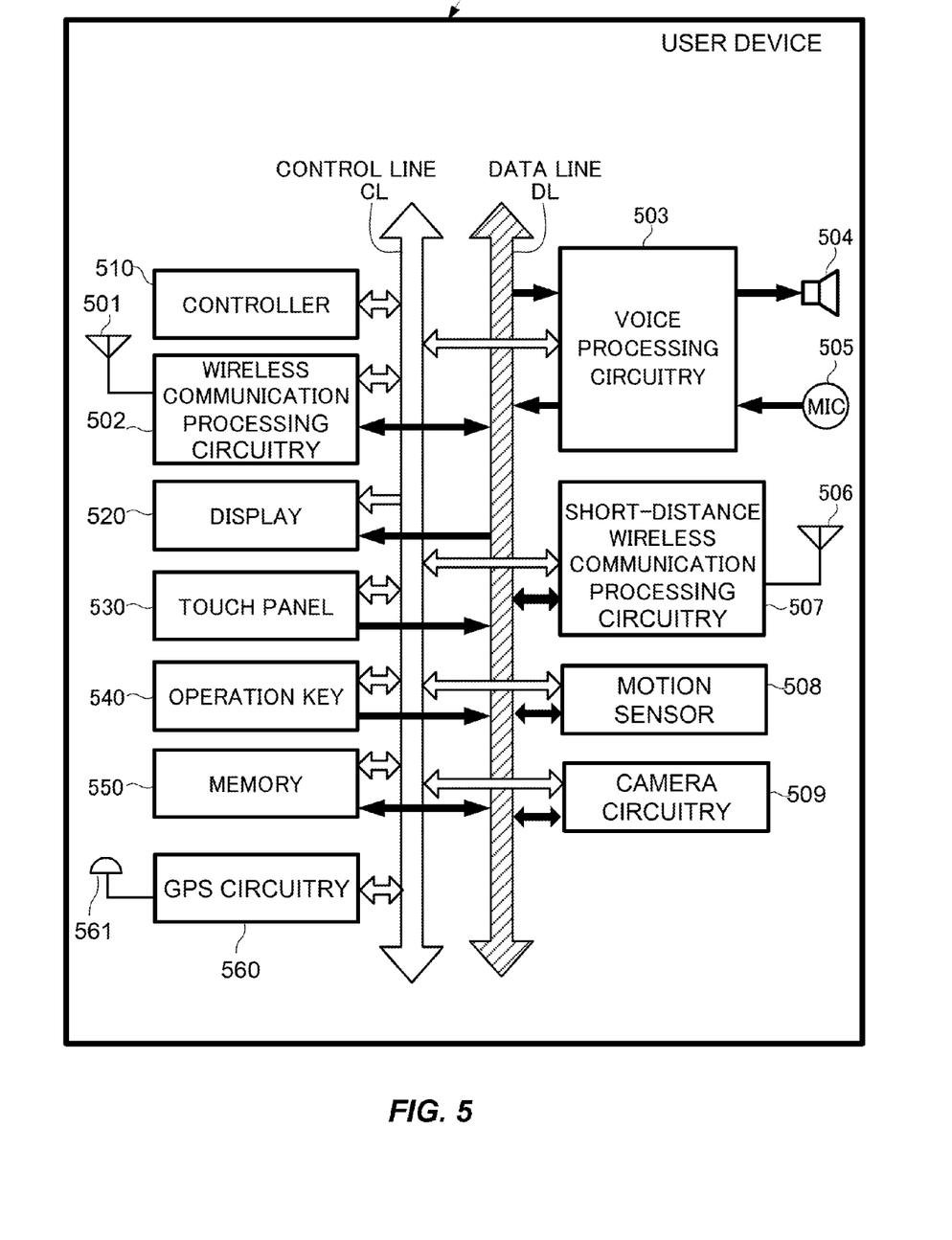
FIG. 5 is a detailed block diagram illustrating hardware of a user device according to an exemplary embodiment of the present disclosure.

FIG. 5 is a detailed block diagram illustrating an exemplary embodiment of the user device 500 according to the present disclosure. The user device 500 is an exemplary embodiment of the navigation apparatus 10. The user device 500 may be implemented in a smartphone. However, the skilled artisan will appreciate that the features described herein may be adapted to be implemented on other devices (e.g., a laptop, a tablet, a server, an e-reader, a camera, a navigation device, heads up display, etc.). The exemplary user device 500 includes a controller 510 and a wireless communication processing circuit 502 connected to an antenna 501. A speaker 504 and a microphone 505 are connected to a voice processing circuitry 503.

The controller 510 may include one or more CPUs, and may control each element in the user device 500 to perform functions related to HMI, communication control, audio signal processing, control for the audio signal processing, still and moving image processing and control, and other kinds of signal processing. The controller 510 may perform these functions by executing instructions stored in a memory 550. For example, the processes illustrated in FIGS. 2, 3A and 3B may be stored in the memory 550 and executed based on the user inputs received via the input interface 101 or the output interface 102. In an exemplary embodiment, the interfaces 101 and 102 are implemented using display 520 and touch panel 530. Alternatively or in addition to the local storage of the memory 550, the functions may be executed using instructions stored on an external device such as the server 20 accessed on a network or on a non-transitory computer readable medium.

The memory 550 includes but is not limited to Read Only Memory (ROM), Random Access Memory (RAM), or a memory array including a combination of volatile and non-volatile memory units. The memory 550 may be utilized as working memory by the controller 510 while executing the processes and algorithms of the present disclosure. Additionally, the memory 550 may be used for long-term storage, e.g., of image data and information related thereto. The memory 550 may be configured to store the battle view information, operation view information and list of commands.

The user device 500 includes a control line CL and data line DL as internal communication bus lines. Control data to/from the controller 510 may be transmitted through the control line CL. The data line DL may be used for transmission of voice data, display data, etc.

The antenna 501 transmits/receives electromagnetic wave signals between base stations for performing radio-based communication, such as the various forms of cellular telephone communication. The wireless communication processing circuit 502 controls the communication performed between the user device 500 and other external devices such as the server 20 via the antenna 501. The wireless communication processing circuit 502 may control communication between base stations for cellular phone communication.

The speaker 504 emits an audio signal corresponding to audio data supplied from the voice processing circuitry 503. The microphone 505 detects surrounding audio and converts the detected audio into an audio signal. The audio signal may then be output to the voice processing circuit 503 for further processing. The voice processing circuit 503 demodulates and/or decodes the audio data read from the memory 550 or audio data received by the wireless communication processing circuity 502 and/or a short-distance wireless communication processing circuitry 507. Additionally, the voice processing circuitry 503 may decode audio signals obtained by the microphone 505. The microphone 505 can be used to input the weights wt1-wt8 of the control parameters CP1-CP8, respectively, or to select the route R1-R4. The input can be a voice command received from the user.

The exemplary user device 500 may also include the display 520 (e.g. the navigation display 112 in FIG. 1), the touch panel 530 (e.g. touch screen 114 in FIG. 1), an operation key 540, and a short-distance communication processing circuitry 507 connected to an antenna 506. The display 520 may be a Liquid Crystal Display (LCD), an organic electroluminescence display panel, or another display screen technology. As discussed above, in addition to displaying still and moving image data, the display 520 may display operational inputs such as the control parameters CP1-CP8 and the corresponding weights wt1-wt8 or sliders S1-S8, in FIG. 2. The display 520 may additionally display a GUI having multiple screens for a user to control aspects of the user device 500 and/or other devices. Further, the display 520 may display characters and images received by the user device 500 and/or stored in the memory 550 or accessed from an external device on a network such as a camera. For example, the user device 500 may access a network such as the Internet and display text and/or images transmitted from a Web server.

The touch panel 530 may include a physical touch panel display screen and a touch panel driver. The touch panel 530 may include one or more touch sensors for detecting an input operation on an operation surface of the touch panel display screen. The touch panel 530 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 530 may detect when the stylus approaches/contacts the operation surface of the touch panel display (similar to the case in which a finger is used for the touch operation).

In certain aspects of the present disclosure, the touch panel 530 may be disposed adjacent to the display 520 (e.g., laminated) or may be formed integrally with the display 520. For simplicity, the present disclosure assumes the touch panel 530 is formed integrally with the display 520 and therefore, examples discussed herein may describe touch operations being performed on the surface of the display 520 rather than the touch panel 530. However, the skilled artisan will appreciate that this is not limiting.

For simplicity, the present disclosure assumes the touch panel 530 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 530 may include transparent electrode touch sensors arranged in the X-Y direction on the surface of transparent sensor glass.

The touch panel driver may be included in the touch panel 530 for control processing related to the touch panel 530, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel 530 and the display 520 may be surrounded by a protective casing, which may also enclose the other elements included in the user device 500. In certain embodiments, a position of the user's fingers on the protective casing (but not directly on the surface of the display 520) may be detected by the touch panel 530 sensors. Accordingly, the controller 510 may perform display control processing described herein based on the detected position of the user's fingers gripping the casing. For example, an element in an interface may be moved to a new location within the interface (e.g., closer to one or more of the fingers) based on the detected finger position.

Further, in certain embodiments, the controller 510 may be configured to detect which hand is holding the user device 500, based on the detected finger position. For example, the touch panel 530 sensors may detect a plurality of fingers on the left side of the user device 500 (e.g., on an edge of the display 520 or on the protective casing), and detect a single finger on the right side of the user device 500. In this exemplary scenario, the controller 510 may determine that the user is wearing the user device 500 with his/her right hand because the detected grip pattern corresponds to an expected pattern when the user device 500 is wearing only with the right hand.

The operation key 540 may include one or more buttons or similar external control elements, which may generate an operation signal based on a detected input by the user. In addition to outputs from the touch panel 530, these operation signals may be supplied to the controller 510 for performing related processing and control. In certain aspects of the present disclosure, the processing and/or functions associated with external buttons and the like may be performed by the controller 510 in response to an input operation on the touch panel 530 display screens rather than the external button, key, etc. In this way, external buttons on the user device 500 may be eliminated in lieu of performing inputs via touch operations, thereby improving water-tightness.

The antenna 506 may transmit/receive electromagnetic wave signals to/from other external apparatuses, and the short-distance wireless communication processing circuitry 507 may control the wireless communication performed between the other external apparatuses. Bluetooth, IEEE 802.11, and near-field communication (NFC) are non-limiting examples of wireless communication protocols that may be used for inter-device communication via the short-distance wireless communication processing circuitry 507.

The user device 500 may include a motion sensor 508. The motion sensor 508 may detect features of motion (i.e., one or more movements) of the user device 500. For example, the motion sensor 508 may include an accelerometer to detect acceleration, a gyroscope to detect angular velocity, a geomagnetic sensor to detect direction, a geo-location sensor to detect location, etc., or a combination thereof to detect motion of the user device 500. In certain embodiments, the motion sensor 508 may generate a detection signal that includes data representing the detected motion. For example, the motion sensor 508 may determine a number of distinct movements in a motion (e.g., from start of the series of movements to the stop, within a predetermined time interval, etc.), a number of physical shocks on the user device 500 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 510, whereby further processing may be performed based on data included in the detection signal. The motion sensor 508 can work in conjunction with a Global Positioning System (GPS) circuitry 560.

The user device 500 may include a camera circuitry 509, which includes a lens and shutter for capturing photographs of the surroundings around the user device 500. In an embodiment, the camera circuitry 509 captures surroundings of an opposite side of the user device 500 from the user. The images of the captured photographs can be displayed on the display 520. A memory circuitry saves the captured photographs. The memory circuitry may reside within the camera circuitry 509 or it may be part of the memory 550. The camera circuitry 509 can be a separate feature attached to the user device 500 or it can be a built-in camera feature. Furthermore, the camera circuitry 509 can be configured to detect features of motion (i.e., one or more movements) of the user device 500.

The controller 510 implemented on the user device 500 (e.g., the navigation apparatus 10) can include an application that requests data processing from the server 20. The server 20, in FIG. 4, includes the storage controller 424 that manages the database on the disk 404 and the query application manager 450 that executes SQL (structured query language) statements against this data on the disk 404 or the database 510. The query application manager 450 also implements processing functions (e.g. query syntax analysis, optimization, and execution plan generation) as well as a simple network communication function to send and receive signal from the network controller 406.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures. For example, this technology may be structured for cloud computing whereby a single function is shared and processed in collaboration among a plurality of apparatuses via a network.

What is claimed is:

1. A navigation apparatus for an autonomous vehicle comprising:
   circuitry configured to
      receive a start location and a destination,
      display a plurality of control parameters that are used to generate at least one optimum route from the start location to the destination, the plurality of control parameters including at least hands-free time, eye-off-road time, and sleep time,
receive, via a user interface, a plurality of weights corresponding to the plurality of control parameters to generate the at least one optimum route and to compute a route score corresponding to each of the at least one optimum route,
transmit, via a network, the plurality of control parameters and the plurality of weights to a server that implements an optimization algorithm to generate the at least one optimum route using the plurality of control parameters and the plurality of weights,
receive, via the network, the at least one optimum route and the route score corresponding to the at least one optimum route generated by the server,
display the at least one optimum route and the route score to enable selection of the at least one optimum route for navigation of the autonomous vehicle from the start location to the destination, and
control movement of the autonomous vehicle based on the optimum route.

2. The navigation apparatus according to claim 1, wherein the plurality of control parameters include a travel time, a safety parameter, and a fuel economy parameter.

3. The navigation apparatus according to claim 1, wherein the circuitry is further configured to receive input corresponding to the plurality of control parameters to allow setting of the plurality of weights.

4. The navigation apparatus according to claim 3, wherein the input is obtained from the user.

5. The navigation apparatus according to claim 3, wherein the plurality of weights can be pre-determined by driving the autonomous vehicle along different routes and collecting data related to at least one of the plurality of control parameters.

6. The navigation apparatus according to claim 1, wherein the circuitry is further configured to re-assign the plurality of weights corresponding to the plurality of control parameters after the display of the at least one optimum route and the route score.

7. The navigation apparatus according to claim 1, wherein the route score is computed using a control parameter ratio based on the plurality of control parameters and the plurality of weights.

8. The navigation apparatus according to claim 7, wherein the control parameter ratio is computed as a function of a plurality of measurements associated with each of the plurality of control parameters.

9. The navigation apparatus according to claim 8, wherein a measurement is at least one of a time or a distance associated with the plurality of control parameters along at least one optimum route.

10. A method for navigation of an autonomous vehicle, the method comprising:
receiving, using processing circuitry, a start location and a destination;
displaying, using the processing circuitry, a plurality of control parameters that are used to generate at least one optimum route from the start location to the destination, the plurality of control parameters including at least hands-free time, eye-off-road time, and sleep time;
receiving, using the processing circuitry, a plurality of weights corresponding to the plurality of control parameters to generate a route score corresponding to the at least one optimum route;
transmitting, via a network, the plurality of control parameters and the plurality of weights to a server that implements an optimization algorithm to generate the at least one optimum route using the plurality of control parameters and the plurality of weights;
receiving, via the network, the at least one optimum route and the route score corresponding to the at least one optimum route generated by the server;
displaying, using the processing circuitry, the at least one optimum route and the route score to enable selection of the at least one optimum route for navigation of the autonomous vehicle from the start location to the destination; and
controlling movement of the autonomous vehicle based on the optimum route.

11. The method according to claim 10, wherein the method further comprises receiving input corresponding to the plurality of control parameters to allow setting of the plurality of weights.

12. The method according to claim 11, wherein the input is obtained from the user.

13. The method according to claim 11, wherein the plurality of weights can be pre-determined by driving the autonomous vehicle along different routes and collecting data related to at least one control parameter.

14. A non-transitory computer-readable medium storing a program which when executed by a computer, causes the computer to perform a method for navigation of an autonomous vehicle, the method comprising:
receiving a start location and a destination;
displaying a plurality of control parameters that are used to generate at least one optimum route from the start location to the destination, the plurality of control parameters including at least hands-free time, eye-off-road time, and sleep time;
receiving a plurality of weights corresponding to the plurality of control parameters to generate a route score corresponding to the at least one optimum route;
transmitting, via a network, the plurality of control parameters and the plurality of weights to a server that implements an optimization algorithm to generate the at least one optimum route using the plurality of control parameters and the plurality of weights;
receiving, via the network, the at least one optimum route and the route score corresponding to the at least one optimum route generated by the server;
displaying the at least one optimum route and the route score to enable selection of the at least one optimum route for navigation of the autonomous vehicle from the start location to the destination; and
controlling movement of the autonomous vehicle based on the optimum route.

* * * * *